(12) United States Patent
Nakatomi et al.

(10) Patent No.: US 11,746,204 B2
(45) Date of Patent: Sep. 5, 2023

(54) HEAT-EXPANDABLE MICROSPHERES AND APPLICATIONS THEREOF

(71) Applicant: MATSUMOTO YUSHI-SEIYAKU CO., LTD., Yao (JP)

(72) Inventors: Daisuke Nakatomi, Yao (JP); Satoshi Kawanami, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 1117 days.

(21) Appl. No.: 16/077,833

(22) PCT Filed: Jan. 26, 2017

(86) PCT No.: PCT/JP2017/002630
§ 371 (c)(1),
(2) Date: Aug. 14, 2018

(87) PCT Pub. No.: WO2017/141653
PCT Pub. Date: Aug. 24, 2017

(65) Prior Publication Data
US 2021/0189090 A1    Jun. 24, 2021

(30) Foreign Application Priority Data
Feb. 19, 2016  (JP) .............................. JP2016-029509

(51) Int. Cl.
*C08J 9/20* (2006.01)
*C08J 9/22* (2006.01)
(Continued)

(52) U.S. Cl.
CPC .............. *C08J 9/20* (2013.01); *C08F 220/14* (2013.01); *C08F 220/44* (2013.01); *C08L 33/12* (2013.01);
(Continued)

(58) Field of Classification Search
CPC ...... C08J 9/20; C08J 2203/22; C08J 2333/20; C08J 9/32; C08F 220/14; C08F 220/44;
(Continued)

(56) References Cited

U.S. PATENT DOCUMENTS

| 4,287,308 A | 9/1981 | Nakayama et al. |
| 2009/0149559 A1* | 6/2009 | Masuda ................ C08F 220/44 521/189 |
| 2017/0081492 A1 | 3/2017 | Sakabe et al. |

FOREIGN PATENT DOCUMENTS

| CN | 102633936 A | 8/2012 |
| JP | 56-113338 A | 9/1981 |

(Continued)

OTHER PUBLICATIONS

Communication dated May 20, 2019 from Swedish Patent Office in counterpart SE Application No. 1851088-3.
(Continued)

*Primary Examiner* — K. Boyle
(74) *Attorney, Agent, or Firm* — Sughrue Mion, PLLC

(57) ABSTRACT

Heat-expandable microspheres having a thermoplastic resin shell and a thermally-vaporizable blowing agent encapsulated therein. The thermoplastic resin is a copolymer produced from a polymerizable component containing 15 to 90 wt % of acrylonitrile, 3 to 50 wt % of an acrylate ester monomer (A) represented by formula (1) shown below, and 3 to 70 wt % of a methacrylate ester monomer (B) represented by formula (2) shown below. The weight ratio of the acrylate ester monomer (A) represented by formula (1) to the methacrylate ester monomer (B) represented by formula (2) in the polymerizable component (A:B) ranges from 10:90 to 90:10:

$$H_2C=CH-COOR^1 \tag{1}$$

$$H_2C=C(CH_3)-COOR^2 \tag{2}.$$

(Continued)

Also disclosed are hollow particles manufactured by expanding the heat-expandable microspheres; a composition containing a base compound and the heat-expandable microspheres or the hollow particles; and a formed product manufactured by molding or applying the composition.

16 Claims, 1 Drawing Sheet

(51) Int. Cl.
*C08F 220/14* (2006.01)
*C08F 220/44* (2006.01)
*C08L 33/12* (2006.01)

(52) U.S. Cl.
CPC ........ *C08J 2203/22* (2013.01); *C08J 2333/20* (2013.01)

(58) Field of Classification Search
CPC .......... C08F 271/02; C08F 2/18; C08L 33/12; C08L 51/003; B01J 13/185; C09K 3/00
See application file for complete search history.

(56) References Cited

FOREIGN PATENT DOCUMENTS

| JP | 63-275649 A | 11/1988 |
|---|---|---|
| JP | 11-147971 A | 6/1999 |
| WO | 2007/058379 A1 | 5/2007 |
| WO | 2015/178329 A1 | 11/2015 |

OTHER PUBLICATIONS

International Search Report for PCT/JP2017/002630, dated Feb. 21, 2017.

Communication dated Jun. 16, 2020, from the China National Intellectual Property Administration in Application No. 201780011584.4.

* cited by examiner

HEAT-EXPANDABLE MICROSPHERES AND APPLICATIONS THEREOF

CROSS-REFERENCE TO RELATED APPLICATIONS

This application is a § 371 of International Application No. PCT/JP2017/002630 filed Jan. 26, 2017 which claims priority from Japanese Patent Application No. 2016-029509 filed Feb. 19, 2016, the contents of all of which are incorporated herein by reference in their entirety.

BACKGROUND OF THE INVENTION

1. Field of the Invention

The present invention relates to heat-expandable microspheres and applications thereof.

2. Description of the Related Art

Heat-expandable microspheres composed of a thermoplastic resin shell and a blowing agent being encapsulated therein and gasifying at a temperature lower than the softening point of the thermoplastic resin are sometimes referred to as heat-expandable microcapsules, and are widely employed in various fields including foamable inks and lightweight additives for resins and paints.

The heat-expandable microspheres employed in some fields, such as paper making, foamable inks and paints, are required to sufficiently expand in a comparatively low temperature region, for example, 80 to 130° C. Heat-expandable microspheres composed of a shell of a copolymer containing high amount of monomer unit derived from vinylidene chloride (vinylidene chloride copolymer) have been known as one of heat-expandable microspheres suitable for such fields of application. For example, heat-expandable microspheres composed of a shell of a copolymer produced from a polymerizable component containing 30 to 80 wt % of vinylidene chloride are disclosed in PTL 1. Such heat-expandable microspheres composed of a shell of vinylidene chloride copolymer exhibit desirable expansion performance in a low temperature region owing to the low Tg and high gas barrier effect of the shell resin, and are one of advantageous heat-expandable microspheres for the fields mentioned above.

The heat-expandable microspheres composed of a shell of vinylidene chloride copolymer, however, are not preferable microspheres from the view point of safety and odor in handling. This is because of the considerable amount of unreacted monomers usually remaining. In addition, the vinylidene chloride type heat-expandable micro spheres sometimes cause problems, such as discoloration of other materials or corrosion of equipment, in manufacturing processes. Furthermore, the vinylidene chloride type heat-expandable microspheres have poor resistance to some solvents and plasticizers (solvent resistance and chemical resistance), and cannot be employed in a field where the microspheres are used with those solvents and plasticizers.

Thus, there has been a demand for the development of heat-expandable microspheres which solve the above problems of conventional vinylidene chloride type heat-expandable microspheres and exhibit sufficient expansion performance at a low temperature.

[PTL 1] Japanese Patent Application Publication 1981-113338

SUMMARY OF THE INVENTION

It is therefore an object of the present invention to provide heat-expandable microspheres having sufficient expansion performance at a low temperature and high solvent resistance, and applications thereof.

Upon diligent study, the present inventors found that the above-noted problems of the related art can be solved by providing heat-expandable microspheres which comprise a copolymer shell produced by polymerizing a polymerizable component containing a specified weight ratio of specific monomer components, to thereby achieve the present invention.

More particularly, the above object of the present invention has been achieved by providing (1) heat-expandable microspheres comprising a thermoplastic resin shell and a thermally-vaporizable blowing agent encapsulated therein. The thermoplastic resin is a copolymer produced from a polymerizable component containing 15 to 90 wt % of acrylonitrile, 3 to 50 wt % of an acrylate ester monomer (A) represented by formula (1) shown below, and 3 to 70 wt % of a methacrylate ester monomer (B) represented by formula (2) shown below. Further, the weight ratio of the acrylate ester monomer (A) represented by formula (1) to the methacrylate ester monomer (B) represented by formula (2) in the polymerizable component (A:B) ranges from 10:90 to 90:10:

$$H_2C=CH-COOR^1 \quad (1)$$

where $R^1$ is a $C_3$-$C_{18}$ linear or branched alkyl group;

$$H_2C=C(CH_3)-COOR^2 \quad (2)$$

where $R^2$ is a $C_1$-$C_4$ linear or branched alkyl group.

In various preferred embodiments, the heat-expandable microspheres (1) of the present invention satisfy at least one of the following requirements i) to v).

i) The total amount of acrylonitrile, the acrylate ester monomer (A) represented by the formula (1) and the methacrylate ester monomer (B) represented by the formula (2) in the polymerizable component ranges from 70 to 100 wt %.

ii) The acrylate ester monomer (A) represented by the formula (1) is at least one monomer selected from the group consisting of n-propyl acrylate, isopropyl acrylate, n-butyl acrylate, isobutyl acrylate, t-butyl acrylate, n-pentyl acrylate and n-hexyl acrylate.

iii) The methacrylate ester monomer (B) represented by the formula (2) is methyl methacrylate.

iv) The amount of methacrylonitrile in the polymerizable component ranges from 0 to less than 5 wt %.

v) The amount of vinylidene chloride in the polymerizable component ranges from 0 to less than 10 wt %.

The present invention also provides (2) hollow particles manufactured by expanding the heat-expandable microspheres.

The present invention yet further provides (3) a composition containing a base component and at least one particulate material selected from the heat-expandable microspheres and hollow particles mentioned above.

The present invention yet further provides (4) a formed product manufactured by molding or applying the composition (3) above.

Advantageous Effects of Invention

The heat-expandable microspheres of the present invention have sufficient expansion performance at a low temperature and good solvent resistance.

The hollow particles of the present invention rarely contract their volume even when stored in a solvent or plasticizer for a long time.

The composition of the present invention can be molded in a low temperature region. The composition containing the heat-expandable microspheres of the present invention and a solvent or plasticizer can be molded stably due to a minimum change in the expansion performance of the heat-expandable microspheres even after a certain period of storage.

REFERENCE SYMBOLS LIST

Figure 1:
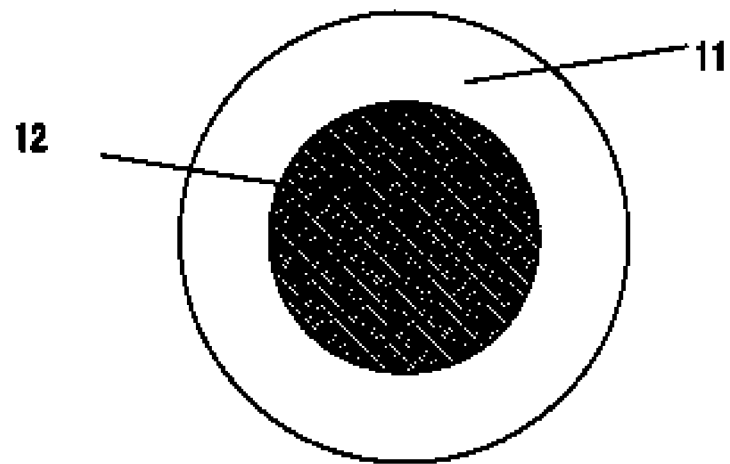
FIG. 1 is a schematic diagram of an example of the heat-expandable micro spheres

Reference symbols used to identify various features in the drawings include the following.

| | |
|---|---|
| 11 | Thermoplastic resin shell |
| 12 | Blowing agent |
| 1 | Hollow particles (fine-particle-coated hollow particles) |
| 2 | Shell |
| 3 | Hollow |
| 4 | Fine particle (in a state of adhesion) |
| 5 | Fine particle (in a state of fixation in a dent) |

DETAILED DESCRIPTION OF THE PREFERRED EMBODIMENTS

The present invention will next be described with reference to the drawings. However, the present invention should not be construed as being limited thereto.

Heat-Expandable Microspheres

As shown in FIG. 1, the heat-expandable microspheres of the present invention comprise a thermoplastic resin shell 11 and a blowing agent (core) 12 encapsulated therein. The heat-expandable microspheres have a core-shell structure and the whole of each microsphere is thermally expandable (expandable by heating). The heat-expandable microspheres of the present invention are specifically described as follows.

The thermoplastic resin constituting the shell of the heat-expandable microspheres of the present invention is a copolymer obtained by polymerizing a polymerizable component containing 15 to 90 wt % of acrylonitrile, 3 to 50 wt % of the acrylate ester monomer (A) represented by formula (1) and 3 to 70 wt % of the methacrylate ester monomer (B) represented by formula (2).

In the present invention, the polymerizable component comprises a monomer component and optionally contains a cross-linking agent. The monomer component is a radically-polymerizable monomer having a polymerizable double bond is a molecule thereof, and is polymerizable by addition polymerization. The cross-linking agent is a radically-polymerizable monomer having a plurality of polymerizable double bonds per molecule, and introduces a cross-linkage in the resultant thermoplastic resin.

The polymerizable component contains 15 to 90 wt % of acrylonitrile. The acrylonitrile is an essential constituent for attaining sufficient expansion performance of the heat-expandable microspheres. The acrylonitrile copolymerized and incorporated in the thermoplastic resin of the shell contributes to an improved gas barrier effect of the shell and minimized permeation of the blowing agent through the shell when the heat-expandable microspheres are thermally expanded, and thus the expansion ratio of the heat-expandable microspheres is efficiently improved. In addition, the acrylonitrile is considered to also contribute to good solvent resistance of the thermoplastic resin constituting the shell.

A polymerizable component containing less than 15 wt % of acrylonitrile causes difficulty in attaining the effect of the present invention. On the other hand, a polymerizable component containing more than 90 wt % of acrylonitrile causes poor softness and elasticity of the resin shell of the resultant heat-expandable microspheres. Namely, although having good solvent resistance, these heat-expandable microspheres exhibit a low expansion ratio and cannot be fed to an actual process.

The amount of acrylonitrile in the polymerizable component is optionally selected within the range mentioned above according to the application of the resultant microspheres. For attaining high expansion performance (especially expansion ratio) of the resultant heat-expandable microspheres at a low temperature, the amount preferably ranges from 25 to 70 wt %, more preferably from 35 to 60 wt %, further more preferably from 40 to 60 wt % and most preferably from 45 to 55 wt %. On the other hand, the amount preferably ranges from 35 to 90 wt %, more preferably from 50 to 90 wt %, further more preferably from 60 to 80 wt % and most preferably from 65 to 80 wt % for attaining good solvent resistance of the resultant heat-expandable microspheres.

The acrylate ester monomer (A) represented by the formula (1) is an essential constituent of the polymerizable component. The acrylate ester monomer (A) represented by formula (1) forms a homopolymer having a low Tg, and the acrylate ester monomer (A) is considered to function to decrease the Tg of the copolymer constituting the resin shell of the heat-expandable microspheres of the present invention so as to contribute to high expansion performance of the heat-expandable microspheres at a low temperature. The polymerizable component which contains a monomer forming a homopolymer having a low Tg is usually processed into heat-expandable microspheres having a significantly low resistance to a solvent and plasticizer (solvent resistance and chemical resistance). The present inventors found that the heat-expandable microspheres produced from a polymerizable component containing the acrylate ester monomer (A) represented by formula (1) have better resistance to a solvent and plasticizer (solvent resistance and chemical resistance) as compared to heat-expandable microspheres produced from a polymerizable component containing other monomers forming a homopolymer having a low Tg. In other words, the acrylate ester monomer (A) represented by formula (1) is considered to minimize a decrease in resistance to a solvent and plasticizer (solvent resistance and chemical resistance) of the resultant thermoplastic resin shell.

In formula (1), $R^1$ represents a $C_3$-$C_{18}$ alkyl group which can be either a linear or a branched chain. If $R^1$ is a $C_1$-$C_2$ substituent group, such as methyl or ethyl group, the resultant heat-expandable microspheres have poor solvent resistance. If $R^1$ is a substituent group having 19 or more carbon atoms, the shell of the resultant heat-expandable microspheres has an insufficient gas barrier effect. As a result, the blowing agent easily permeates the shell of the heat-expandable microspheres and decreases the expansion ratio of the thermally expanded microspheres. $R^1$ includes, for example, n-propyl group, isopropyl group, n-butyl group, isobutyl group, t-butyl group, n-pentyl group, isopentyl group, n-hexyl group, isohexyl group, n-heptyl group, isoheptyl group, n-octyl group, isooctyl group, 2-ethylhexyl group, n-nonyl group, isononyl group, n-decyl group, isodecyl group, n-undecyl group, isoundecyl group, n-dodecyl group, isododecyl group, n-tridecyl group, isotridecyl group, n-tetradecyl group, isotetradecyl group, n-pentadecyl group, isopentadecyl group, n-hexadecyl group, isohexadecyl group, 2-hexyldecyl group, n-heptadecyl group, isoheptadecyl group, n-octadecyl group, isooctadecyl group, 2-octyldecyl group and 2-hexydodecyl group. One of or a combination of at least two of the acrylate ester monomers (A) represented by formula (1) can be used.

Of those monomers, the acrylate ester monomer (A) represented by formula (1) is preferably at least one monomer selected from the group consisting of n-propyl acrylate, isopropyl acrylate, n-butyl acrylate, isobutyl acrylate, t-butyl acrylate, n-pentyl acrylate and n-hexyl acrylate, and n-butyl acrylate is especially preferable as the acrylate ester monomer (A) represented by formula (1).

The polymerizable component contains 3 to 50 wt % of the acrylate ester monomer (A) represented by formula (1). A polymerizable component containing less than 3 wt % of the acrylate ester monomer (A) represented by formula (1) results in poor expansion performance (especially expansion ratio) of the resultant heat-expandable microspheres at a low temperature. Further, a polymerizable component containing more than 50 wt % of acrylate ester monomer (A) results in poor solvent resistance of the resultant heat-expandable microspheres or a low gas barrier effect of the shell of the microspheres. This causes easy permeation of the blowing agent and decreases the expansion ratio of the microspheres that are thermally expanded.

The amount of the acrylate ester monomer (A) represented by formula (1) in the polymerizable component preferably ranges from 5 to 45 wt %, more preferably from 10 to 40 wt %, further more preferably from 15 to 35 wt % and most preferably from 15 to 30 wt % in that order for attaining a high expansion performance (especially expansion ratio) of the resultant heat-expandable microspheres at a low temperature. On the other hand, the amount preferably ranges from 5 to 30 wt %, more preferably from 5 to 25 wt % and further more preferably from 10 to 20 wt % in that order for attaining good solvent resistance of the resultant heat-expandable microspheres.

The methacrylate ester monomer (B) represented by formula (2) is an essential constituent of the polymerizable component. The methacrylate ester monomer (B) represented by formula (2) is considered to impart optimum softness and elasticity, which are optimum for expanding heat-expandable microspheres, to the thermoplastic resin constituting the shell of the heat-expandable microspheres so as to attain a high expansion performance of the heat-expandable microspheres.

In formula (2), $R^2$ represents $C_1$-$C_4$ alkyl group which can be either a linear or a branched chain. If $R^2$ is a substituent group other than an alkyl group, the shell of the resultant heat-expandable microspheres has insufficient gas barrier effect. As a result, the blowing agent easily permeates the shell and decreases the expansion ratio of the heat-expandable microspheres that are thermally expanded. $R^2$ includes, for example, methyl group, ethyl group, n-propyl group, isopropyl group, n-butyl group, isobutyl group and t-butyl group. One of or a combination of at least two of the methacrylate ester monomers (B) represented by the formula (2) can be used.

Of those monomers, the methacrylate ester monomer (B) represented by formula (2) is preferably at least one monomer selected from the group consisting of methyl methacrylate, ethyl methacrylate and n-butyl methacrylate, and methyl methacrylate is especially preferable for the methacrylate ester monomer (B) represented by formula (2).

The polymerizable component contains 3 to 70 wt % of the methacrylate ester monomer (B) represented by formula (2). The polymerizable component containing the methacrylate ester monomer (B) represented by formula (2) in an amount beyond that range causes difficulty in attaining the effect of the present invention.

The amount of the methacrylate ester monomer (B) represented by formula (2) in the polymerizable component preferably ranges from 5 to 60 wt %, more preferably from 10 to 50 wt %, further more preferably from 25 to 50 wt % and most preferably from 35 to 50 wt % for attaining a high expansion performance (especially expansion ratio) of the resultant heat-expandable microspheres at a low temperature. On the other hand, the amount preferably ranges from 5 to 50 wt %, more preferably from 5 to 40 wt %, further more preferably from 10 to 30 wt % and most preferably from 10 to 20 wt % for attaining good solvent resistance of the resultant heat-expandable microspheres.

The present inventors also found that the ratio between the acrylate ester monomer (A) represented by formula (1) and the methacrylate ester monomer (B) represented by formula (2) in the polymerizable monomer is an important feature of the present invention through the study of solving the problem addressed by the present invention. In the present invention, the weight ratio of the acrylate ester monomer (A) represented by formula (1) to the methacrylate ester monomer (B) represented by formula (2) in the polymerizable component (A:B) ranges from 10:90 to 90:10. A weight ratio (A:B) lower than 10:90 causes insufficient expansion performance (especially expansion ratio) of the heat-expandable microspheres at a low temperature. On the other hand, a weight ratio (A:B) higher than 90:10 results in a decreased gas barrier effect of the shell of the resultant heat-expandable microspheres which in turn leads to easy permeation of the blowing agent through the shell and a decreased expansion ratio of the heat-expandable microspheres that are thermally expanded.

For achieving a more pronounced effect, the weight ratio (A:B) preferably ranges from 20:80 to 75:25, more preferably from 25:75 to 70:30, further more preferably from 30:70 to 67:33 and most preferably from 33:67 to 67:33 if priority is given to the expansion performance (especially expansion ratio) of the heat-expandable microspheres at a low temperature. Further, the weight ratio (A:B) preferably ranges from 10:90 to 50:50, more preferably from 10:90 to 40:60, further more preferably from 10:90 to 30:70 and most preferably from 10:90 to 20:80 if priority is given to the solvent resistance of the heat-expandable microspheres.

The total amount of the acrylonitrile, the acrylate ester monomer (A) represented by formula (1) and the methacrylate ester monomer (B) represented by formula (2) in the polymerizable component is not specifically restricted and preferable ranges from 70 to 100 wt %. An amount of less than 70 wt % can fail to sufficiently attain the effect of the present invention. The lower limit of the amount is preferably at least 80 wt %, more preferably at least 90 wt % and most preferably at least 95 wt % in order to attain a pronounced effect of the present invention. An upper limit of the amount is preferably not higher than 99 wt % and more preferably not higher than 98 wt %.

The polymerizable component can contain a monomer (hereinafter also referred to as "other monomer (C)") which is polymerizable with and different from the acrylonitrile, acrylate ester monomer (A) represented by formula (1) and the methacrylate ester monomer (B) represented by formula (2). The "other monomer (C)" is a radically-polymerizable monomer having a double bond in each molecule thereof and does not include a cross-linking agent.

The "other monomer (C)" includes, for example, nitrile monomers except acrylonitrile, acrylate ester monomers except the acrylate ester monomer (A) represented by formula (1), methacrylate ester monomers except the methacrylate ester monomer (B) represented by formula (2), halogen-containing vinylidene monomers, halogen-containing vinyl monomers, vinyl ester monomers, carboxyl-group-containing monomers, acrylamide monomers, maleimide monomers, styrene monomers, ethylenically-unsaturated monoolefin monomers, vinyl ether monomers, vinyl ketone monomers and N-vinyl monomers.

The nitrile monomers except acrylonitrile include, for example, methacrylonitrile, α-chloroacrylonitrile, α-ethoxyacrylonitrile, fumaronitrile, maleonitrile, crotononitrile and cinnamonitrile.

The acrylate ester monomers except the acrylate ester monomer (A) represented by formula (1) include, for example, methyl acrylate, ethyl acrylate, cyclohexyl acrylate, isobornyl acrylate, phenyl acrylate, benzyl acrylate, tolyl acrylate, 2-methoxyethyl acrylate, 2-methoxybutyl acrylate, glycidyl acrylate, methyl glycidyl acrylate, 2-hydroxyethyl acrylate, 2-hydroxypropyl acrylate, 3-hydroxypropyl acrylate, 2-hydroxybutyl acrylate, 4-hydroxybutyl acrylate, 2-aminoethyl acrylate, N,N-dimethyl aminoethyl acrylate, N,N-dimethyl aminopropyl acrylate, 3-(acryloyloxy) propyltrimethoxysilane, 3-(acryloyloxy) propyltriethoxysilane, and oxyalkylenated acrylic acids.

The methacrylate ester monomers except the methacrylate ester monomer (B) represented by formula (2) include, for example, n-pentyl methacrylate, n-hexyl methacrylate, n-heptyl methacrylate, n-octyl methacrylate, 2-ethylhexyl methacrylate, n-nonyl methacrylate, isononyl methacrylate, decyl methacrylate, dodecyl methacrylate, stearyl methacrylate, cyclohexyl methacrylate, isobornyl methacrylate, phenyl methacrylate, benzyl methacrylate, tolyl methacrylate, 2-methoxyethyl methacrylate, 2-methoxybutyl methacrylate, glycidyl methacrylate, methyl glycidyl methacrylate, 2-hydroxyethyl methacrylate, 2-hydroxypropyl methacrylate, 3-hydroxypropyl methacrylate, 2-hydroxybutyl methacrylate, 4-hydroxybutyl methacrylate, 2-aminoethyl methacrylate, N,N-dimethyl aminoethyl methacrylate, N,N-dimethyl aminopropyl methacrylate, 3-(methacryloyloxy) propyltrimethoxysilane, 3-(methacryloyloxy) propyltriethoxysilane, and oxyalkylenated methacrylic acids.

The halogen-containing vinylidene monomers include, for example, vinylidene chloride, vinylidene bromide and vinylidene fluoride. The halogen-containing vinyl monomers include, for example, vinyl chloride, vinyl bromide and vinyl fluoride.

Vinyl ester monomers include, for example, vinyl acetate, vinyl propionate and vinyl butyrate.

Carboxyl-group-containing monomers include, for example, acrylic acid, methacrylic acid, itaconic acid, maleic acid, fumaric acid and citraconic acid. A part of or the whole of the carboxyl groups in the carboxyl-group-containing monomers can be neutralized in the polymerization.

The acrylamide monomer includes, for example, acrylamide, substituted acrylamide, methacrylamide and substituted methacrylamide.

The maleimide monomer includes, for example, N-phenyl maleimide, N-(2-chlorophenyl) maleimide, N-cyclohexyl maleimide and N-lauryl maleimide. The maleimide monomer is preferably a N-substituted maleimide monomer having a nitrogen atom bonded with a substituent group. The polymerizable component containing a maleimide monomer is preferable for minimized coloring of the resultant heat-expandable microspheres.

The styrene monomer includes, for example, styrene, α-methyl styrene, o-methyl styrene, m-methyl styrene, p-methyl styrene, p-ethyl styrene, 2,4-dimethyl styrene, p-n-butyl styrene, p-t-butyl styrene, p-n-hexyl styrene, p-n-octyl styrene, p-n-nonyl styrene, p-n-decyl styrene, p-n-dodecyl styrene, n-methoxystyrene, p-phenyl styrene, p-chlorostyrene and 3,4-dichlorostyrene.

The ethylenically unsaturated monoolefin monomer includes, for example, ethylene, propylene, butylene, and isobutylene.

The vinyl ether monomer includes, for example, vinyl methyl ether, vinyl ethyl ether and vinyl isobutyl ether.

The vinyl ketone monomer includes, for example, vinyl methyl ketone, vinyl hexyl ketone, and methyl isopropenyl ketone.

The N-vinyl monomer includes, for example, N-vinyl pyrrole, N-vinyl carbazole, N-vinyl indole, and N-vinyl pyrrolidone.

As for the other monomer (C), one of or a combination of at least two of the other monomers (C) can be employed.

The amount of the other monomer (C) in the polymerizable component is not specifically restricted and preferably ranges from 0 to 30 wt %, more preferably from 0 to 20 wt %, further more preferably from 0 to 10 wt %, and most preferably from 0 to 5 wt %. An amount of the other monomer (C) higher than 30 wt % may fail to attain a sufficient effect of the present invention.

The amount of the methacrylonitrile in the polymerizable component preferably ranges from 0 to less than 5 wt % so as to allow for sufficient expansion performance of the microspheres at low temperature. A polymerizable component containing 5 wt % or more of the methacrylonitrile can lead to high expansion temperature of the resultant heat-expandable microspheres and insufficient expansion of the microspheres at a low temperature. A more preferable amount of the methacrylonitrile is less than 3 wt %.

The amount of the vinylidene chloride in the polymerizable component preferably ranges from 0 to less than 10 wt % and more preferably from 0 to less than 5 wt % for attaining sufficient solvent resistance and chemical resistance of the resultant heat-expandable microspheres. For the purpose of reducing environmental load, preferably the polymerizable component contains virtually no vinylidene chloride if the heat expandable microcapsules having a low halogen content are required.

The polymerizable component containing monomer components having halogens, oxygen atoms and nitrogen atoms in their molecules is effective to prevent agglomeration of the heat-expandable microspheres in a polymerization process or scale generation in a polymerization reactor.

The polymerizable component can contain a polymerizable monomer (cross-linking agent) having at least two polymerizable double bonds per molecule in addition to the monomers mentioned above. The polymerizable component polymerized with the cross-linking agent will control a decrease in the ratio of the blowing agent retained in thermally expanded microspheres (retention ratio of the blowing agent encapsulated in microspheres) and achieve efficient thermal expansion of the microspheres.

The cross-linking agent is not specifically restricted, and includes, for example, divinylbenzene, divinyl naphthalene, neopentyl glycol-acrylic acid-benzoate ester, trimethylol propane-acrylic acid-benzoate ester, 2-butyl-2-ethyl-1,3-propanediol diacrylate, ethylene glycol di(meth)acrylate, diethylene glycol di(meth)acrylate, triethylene glycol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, glycerin di(meth)acrylate, dimethylol-tricyclodecane di(meth)acrylate, hydroxypivalic acid neopentylglycol diacrylate, trimethylolpropane tri(meth)acrylate, pentaerythritol tri(meth)acrylate, pentaerythritol tetra(meth)acrylate, dipentaerythritol hexa(meth)acrylate, 2-hydroxy-3-acryloiloxylpropyl methacrylate, ditrimethylolpropane tetraacrylate, allyl methacrylate, triacrylformal and triallyl isocyanate. One of or a combination of at least two of those cross-linking agents can be used. The compounds expressed as "PEG (XXX) di(meth)acrylate" are polyethyleneglycol di(meth)acrylates, and the numbers in the parentheses represent the average molecular weight of the polyethylene glycol moiety. The term "(meth)acrylate" means acrylate or methacrylate.

The amount of the cross-linking agent, which is not an essential component, is not specifically restricted, and preferably ranges from 0 to 3 wt % of the polymerizable component, more preferably from 0.05 to 2 wt %, further more preferably from 0.1 to 1.75 wt %, and most preferably from 0.2 to 1.5 wt % in order to optimize the degree of cross linking, retention ratio of the blowing agent encapsulated in heat-expandable microspheres, and heat resistance and thermal expansion performance of the resultant heat-expandable microspheres.

The blowing agent is vaporizable by heating and includes, for example, straight-chain hydrocarbons, such as propane, butane, pentane, hexane, heptane, octane, nonane, decane, dodecane, undecane, tridecane, tetradecane, pentadecane and hexadecane; branched hydrocarbons, such as isobutene, isopentane, isohexane, isoheptane, isooctane, isononane, isodecane, isododecane, 3-methyl undecane, isotridecane, 4-methyl dodecane, isotetradecane, isopendadecane, isohexadecane, 2,2,4,4,6,8,8-heptamethylnonane, isoheptadecane and isooctadecane; alicyclic hydrocarbons, such as cyclopentane, cyclohexane, cycloheptane, cyclooctane, cyclononane, cyclodecane and cyclododecane; petroleum ethers; halides of the petroleum ethers; fluorine-containing compounds, such as hydrofluoroether; tetraalkyl silane; and compounds which thermally decompose to generated gases. The blowing agent can be any of straight-chain, branched or alicyclic compounds, and preferably is an aliphatic compound. The blowing agents can be used alone or a combination of at least two of the blowing agents can be used.

The blowing agent preferably contains at least one compound selected from the group consisting of propane, butane, pentane, hexane, heptane, isobutane, isopentane, isohexane, isoheptane, isooctane, cyclopentane, cyclohexane and petroleum ethers, and more preferably contain isobutane for improved expansion performance of the heat-expandable microspheres in low temperature region. The amount of isobutane in the blowing agent is not specifically restricted and preferably ranges from 50 to 100 wt % and more preferably from 75 to 100 wt %.

The boiling point of the blowing agent is not specifically restricted and preferably ranges from −30 to 100° C., more preferably from −25 to 90° C., further more preferably from −20 to 80° C., and most preferably from −15 to 70° C.

The expansion-initiation temperature ($T_s$) of the heat-expandable microspheres is not specifically restricted, and preferably ranges from 50 to 120° C., more preferably from 55 to 110° C., further more preferably from 60 to 100° C., yet further more preferably from 60 to 90° C., and most preferably from 60 to 85° C. Heat-expandable microspheres having an expansion-initiation temperature lower than 50° C. can have poor storage stability. On the other hand, heat-expandable microspheres having an expansion-initiation temperature higher than 120° C. can expand insufficiently at a low temperature.

The maximum expansion temperature ($T_{max}$) of the heat-expandable microspheres is not specifically restricted, and preferably ranges from 80 to 140° C., more preferably from 85 to 135° C., further more preferably from 90 to 130° C., and most preferably from 100 to 125° C. Heat-expandable microspheres having a maximum expansion temperature lower than 80° C. expand in a narrow temperature range to cause difficulty in controlling expansion of the microspheres. On the other hand, heat-expandable microspheres having a maximum expansion temperature higher than 140° C. may expand insufficiently at a low temperature.

The expansion-initiation temperature ($T_s$) and maximum expansion temperature ($T_{max}$) of the heat-expandable microspheres of the present invention are determined in the methods described in the Examples.

The mean particle size of the heat-expandable microspheres is not specifically restricted, and preferably ranges from 1 to 50 μm, more preferably from 3 to 40 μm, further more preferably from 7 to 33 μm, yet further more preferably from 10 to 30 μm, and most preferably from 15 to 25 μm for providing sufficient expansion of the microspheres at a low temperature. Heat-expandable microspheres having a mean particle size beyond the range of from 1 to 50 μm may have an extremely low expansion performance.

The coefficient of variation, CV, of the particle size distribution of the heat-expandable microspheres is not specifically restricted, and preferably is not greater than 40%, more preferably not greater than 35%, and most preferably not greater than 30%. The CV can be calculated by the following formulae (I) and (II)

$$CV = (s/\langle x \rangle) \times 100 (\%) \qquad (I)$$

$$s = \left\{ \sum_{i=1}^{n} (xi - \langle x \rangle)^2 / (n-1) \right\}^{1/2} \qquad (II)$$

(where s is a standard deviation of the particle size of the microspheres, <x> is a mean particle size of the microspheres, "xi" is the particle size of the i-th particle, and n represents the number of particles.)

The encapsulation ratio of the blowing agent is defined as the percentage of the blowing agent encapsulated in heat-expandable microspheres to the weight of the heat-expandable microspheres. The encapsulation ratio of the blowing agent is not specifically restricted, and preferably ranges from 1 to 50 wt %, more preferably from 2 to 45 wt %, further more preferably from 5 to 40 wt % and most preferably from 10 to 30 wt % for sufficient expansion of the heat-expandable microspheres at a low temperature. An encapsulation ratio of the blowing agent beyond the range of from 1 to 50 wt % can lead to extremely low expansion performance of the heat-expandable microspheres.

The maximum expansion ratio of the heat-expandable microspheres is not specifically restricted, and is preferably at least 3 times, more preferably at least 10 times, yet more preferably at least 20 times, further more preferably at least 30 times, yet further more preferably at least 50 times, and most preferably at least 70 times. On the other hand, an upper limit of the maximum expansion ratio of the heat-expandable microspheres is preferably 200 times. The maximum expansion ratio of the heat-expandable microspheres mentioned as used herein is the highest ratio of the volume of a group of heat-expandable microspheres thermally expanded to the volume of the same group of heat-expandable microspheres before thermal expansion (in other words the same group of heat-expandable microspheres which do not have a heat history equal to or higher than their expansion-initiation temperature and clearly do not show any expansion). Thus the maximum expansion ratio can be represented by the expression, $V_2/V_1$ (times), where $V_1$ is the volume of a group of heat-expandable microspheres before thermal expansion and $V_2$ is the maximum volume of the same group of heat-expandable microspheres after thermal expansion. In the expression, the maximum expansion of heat-expandable microspheres is defined by the volume of the heat-expandable microspheres. On the other hand, the maximum expansion of heat-expandable microspheres can be defined by the true specific gravity of the heat-expandable microspheres. The maximum expansion ratio based on the true specific gravity of heat-expandable microspheres can be represented by the expression, $f_1/d_2$ (times), where $d_1$ is the average true specific gravity of a group of heat-expandable microspheres before thermal expansion and $d_2$ is the minimum true specific gravity of the same group of heat-expandable microspheres after thermal expansion. Usually $V_2/V_1$ and $d_1/d_2$ are similar to each other and either of them can be employed to represent the maximum expansion ratio of heat-expandable microspheres. The maximum expansion ratio of heat-expandable microspheres mentioned herein is represented by $d_1/d_2$.

When the heat-expandable microspheres are required to be thermally expanded into pressure-resistant hollow particles, the maximum expansion ratio of the heat-expandable microspheres is preferably at least 3 times and the upper limit of the maximum expansion ratio is preferably 100 times in order to obtain hollow particles having a sufficiently thick shell. Heat-expandable microspheres having a maximum expansion ratio lower than 3 times may fail to sufficiently reduce the density of the material blended with the microspheres, while heat-expandable particles having a maximum expansion ratio higher than 100 times can be processed into hollow particles having insufficient pressure resistance.

When a resin composition containing the heat-expandable microspheres is heated and expanded into a lightweight article, the maximum expansion ratio of the heat-expandable microspheres is preferably at least 20 times and the upper limit of the maximum expansion ratio is preferably 200 times. The heat-expandable micro spheres having a maximum expansion ratio of lower than 20 times can cause insufficient expansion of the resultant product containing the heat-expandable microspheres, while heat-expandable microspheres having a maximum expansion ratio higher than 200 times can roughen the surface of the resultant product containing the heat-expandable microspheres.

The thermal expansion performance of the heat-expandable microspheres usually decreases after the microspheres are immersed in a solvent. The heat-expandable microspheres of the present invention have a high solvent resistance which achieves an advantageous effect, that is, almost no impairment in their thermal expansion performance (especially their expansion ratio) even after being immersed in a solvent for a considerable period of time. Thus the heat-expandable microspheres of the present invention can be combined with materials containing solvents, such as liquid compositions, pastes including vinyl chloride pastes, EVA emulsions, acrylate emulsions and solvent-type binders.

The solvents mentioned herein include organic solvents and plasticizers. The organic solvents include, for example, aromatic compounds, such as benzene, toluene and xylene; alcohols, such as methanol, ethanol, isopropyl alcohol, butanol and ethylene glycol; hydrocarbons, such as hexane, cyclohexane and terpene; chlorine-containing compounds, such as chloroform and perchloroethylene; ketones, such as acetone, methylethyl ketone and cycrohexanone; esters, such as ethyl acetate and butyl acetate; and amides, such as N,N-dimethylformamide. The plasticizers include, for example, phthalate esters, such as dibutyl phthalate (DBP), dioctyl phthalate (DOP), diethylhexyl phthalate (DEHP), diisononyl phthalate (DINP) and diheptyl phthalate (DHP); and fatty acid esters, such as diethylhexyl adipate (DOA), diethylhexyl azelate and diethylhexyl sebacate.

Process for Producing Heat-Expandable Microspheres

The process for producing the heat-expandable micro spheres of the present invention is not specifically restricted, and the heat-expandable microspheres can be produced in a process including a step of dispersing an oily mixture containing the polymerizable component and blowing agent in an aqueous dispersion medium to polymerize the polymerizable component (hereinafter also referred to as the polymerization step). The details of the blowing agent, polymerizable component and heat-expandable microspheres are as mentioned above.

In the process mentioned above, the polymerizable component is preferably polymerized in the presence of a polymerization initiator. The polymerization initiator is not specifically restricted, and peroxides and azo compounds are generally used.

The peroxides include, for example, peroxidicarbonates, such as diisopropyl peroxydicarbonate, di-sec-butyl peroxydicarbonate, di-(2-ethylhexyl) peroxydicarbonate and dibenzyl peroxydicarbonate; diacyl peroxides, such as lauroyl peroxide and benzoyl peroxide; ketone peroxides, such as methylethyl ketone peroxide and cyclohexanone peroxide; peroxyketals, such as 2,2-bis(t-butyl peroxy) butane; hydroperoxides, such as cumene hydroperoxide and t-butyl hydroperoxide; dialkyl peroxides, such as dicumyl peroxide and di-t-butyl peroxide; and peroxyesters, such as t-hexyl peroxypivalate and t-butyl peroxyisobutylate.

The azo compound includes, for example, 2,2'-azobis(4-methoxy-2,4-dimethyl valeronitrile), 2,2'-azobisisobutylonitrile, 2,2'-azobis(2,4-dimethyl valeronitrile), 2,2'-azobis(2-methyl propionate), 2,2'-azobis(2-methyl butylonitrile) and 1,1'-azobis(cyclohexane-1-carbonitrile).

The amount of the polymerization initiator is not specifically restricted, and preferably ranges from 0.05 to 10 parts by weight of 100 parts by weight of the polymerizable component, more preferably from 0.1 to 8 parts by weight, and most preferably from 0.2 to 5 parts by weight. An amount of the polymerization initiator lower than 0.05 parts by weight can increase the amount of unpolymerized monomer components. An amount of the polymerization initiator higher than 10 parts by weight can decrease the retention ratio of the blowing agent in the thermally expanded microspheres.

In the production process mentioned above, the oily mixture is dispersed in the aqueous dispersion medium to be prepared into an aqueous suspension, in which the polymerizable component is polymerized.

The aqueous dispersion medium contains water, such as deionized water, as the main component to disperse the oily mixture. The medium can further contain alcohols, such as methanol, ethanol and propanol, and hydrophilic organic solvents, such as acetone. The hydrophilic property as used herein means a property of a substance or mixture optionally miscible in water. The amount of the aqueous dispersion medium used in the process is not specifically restricted, and preferably ranges from 100 to 1000 parts by weight to 100 parts by weight of the polymerizable component The aqueous dispersion medium can further contain an electrolyte, such as sodium chloride, magnesium chloride, calcium chloride, sodium sulfate, magnesium sulfate, ammonium sulfate, and sodium carbonate. One of or a combination of at least two of those electrolytes can be used. The amount of the electrolyte is not specifically restricted, and preferably ranges from 0.1 to 50 parts by weight to 100 parts by weight of the aqueous dispersion medium.

The aqueous dispersion medium can contain at least one water-soluble compound selected from the group consisting of polyalkylene imines having a nitrogen atom bonded with an alkyl group substituted by a hydrophilic functional group selected from the group consisting of carboxylic acid (salt) groups and phosphonic acid (salt) groups; water-soluble 1,1-substitution compounds having a carbon atom bonded with a hetero atom and with a hydrophilic functional group selected from the group consisting of hydroxyl group, carboxylic acid (salt) groups and phosphonic acid (salt) groups; potassium dichromate; alkali metal nitrite salts; metal (III) halides; boric acid; water-soluble ascorbic acids; water-soluble polyphenols; water-soluble vitamin Bs; and water-soluble phosphonic acids and phosphonate salts. The term "water-soluble" as used herein means that at least 1 g of a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound can fail to achieve a sufficient effect by the water-soluble compound. On the other hand, an excessive amount of the water-soluble compound can decrease the polymerization rate or increase the amount of the residue of the polymerizable component which failed to be polymerized and formed into the microspheres.

The aqueous dispersion medium can contain a dispersion stabilizer or dispersion stabilizing auxiliary in addition to the electrolytes and water-soluble compounds.

The dispersion stabilizer is not specifically restricted, and includes, for example, calcium triphosphate; magnesium pyrophosphate and calcium pyrophosphate produced by double reaction; colloidal silica; alumina sol; and magnesium hydroxide. One of or a combination of at least two of those dispersion stabilizers can be used.

The amount of the dispersion stabilizer preferably ranges from 0.1 to 100 parts by weight to 100 parts by weight of the polymerizable component, and more preferably from 0.5 to 70 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of those dispersion stabilizing auxiliaries can be used The aqueous dispersion medium is prepared by optionally blending an electrolyte, a water-soluble compound, a dispersion stabilizer and a dispersion stabilizing auxiliary with water (deionized water). The pH of the aqueous dispersion medium during polymerization is adjusted depending on the variants of the water-soluble compound, dispersion stabilizer, and dispersion stabilizing auxiliary.

In the production process mentioned above, the polymerization can be carried out in the presence of sodium hydroxide or a combination of sodium hydroxide and zinc chloride.

In the production process mentioned above, the oily mixture is dispersed and suspended in the aqueous dispersion medium to be formed into oil globules of a prescribed particle size The methods for dispersing and suspending the oily mixture include generally known dispersion techniques, such as agitation with a Homo-mixer (for example, a device manufactured by PRIMIX Corporation), dispersion with a static dispersing apparatus such as a Static mixer (for example, a device manufactured by Noritake Engineering Co., Ltd.), a membrane suspension technique, and ultrasonic dispersion.

The suspension polymerization is then started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be set optionally depending on the variant of the polymerization initiator, and is preferably adjusted within the range from 30 to 100° C., and more preferably from 40 to 90° C. The polymerization temperature is preferably maintained for about 1 to 20 hours. The initial pressure for the polymerization is not specifically restricted, and is preferably controlled within the range from 0 to 5 MPa in gauge pressure, and more preferably from 0.1 to 3 MPa.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to be processed into dry powder with a moisture content not greater than 6 wt %, preferably not greater than 5 wt % and more preferably not greater than 4 wt %.

The cake can be washed with water and/or redispersed in water and then filtered again before the drying process so as to decrease the content of the ionic substances. The slurry can also be dried with a spray dryer or fluidized bed dryer to be processed into dry powder.

Hollow Particles

The hollow particles of the present invention are expanded products of the heat-expandable microspheres mentioned above, which are manufactured by heating—and expanding the heat-expandable microspheres. The hollow particles are lightweight and exhibit excellent properties in a composition or formed product.

The process for manufacturing the hollow particles includes dry thermal expansion methods and wet thermal expansion methods, and the process includes the step of conveying the heat-expandable microspheres into a hopper by vacuum feeding, pneumatic feeding or screw feeding.

The hollow particles of the present invention are manufactured by heating and expanding the heat-expandable microspheres mentioned above preferably at a temperature ranging from 100 to 400° C.

The mean particle size of the hollow particles is not specifically restricted, and is optionally designed according to the application of the particles. The mean particle size preferably ranges from 1 to 1000 µm, and more preferably from 3 to 200 µm. The coefficient of variation, CV, of the particle size distribution of the hollow particles is not specifically restricted, and is preferably not higher than 50%, and more preferably not higher than 40%.

The true specific gravity of the hollow particles is not specifically restricted, and preferably ranges from 0.005 to 0.6, more preferably from 0.015 to 0.4 and most preferably from 0.020 to 0.3. Hollow particles having a specific gravity less than 0.005 can have poor durability. On the other hand, hollow particles having a specific gravity greater than 0.6 is not cost-effective, because such hollow particles have poor lightweight effect and a high amount of the hollow particles is required to prepare a composition containing the hollow particles.

Figure 2:
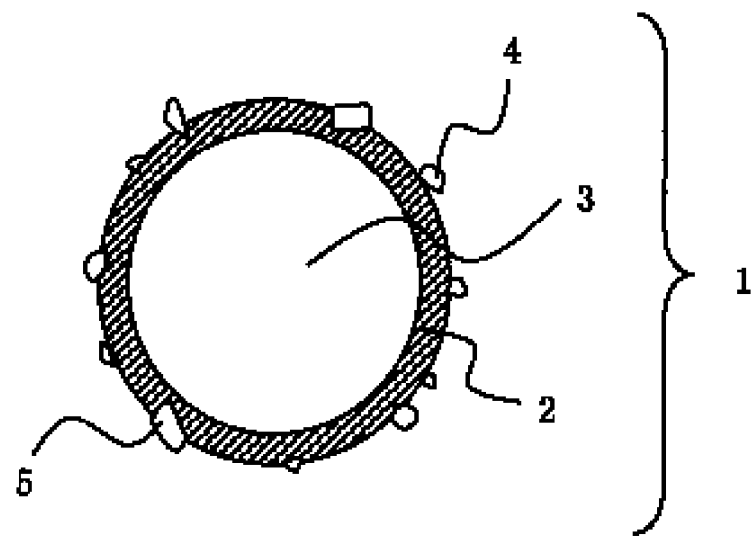
FIG. 2 is a schematic diagram of an example of the hollow particles

The hollow particles (1) can include fine particles (4 and 5) coating the outer surface of their shell (2) as shown in FIG. 2, and such hollow particles including hollow (3) are hereinafter also referred to as fine-particle-coated hollow particles (1).

The coating mentioned as used herein means that the fine particles (4 and 5) are in a state of adhesion (4) on the shell (2) of the hollow particles (1), or in a state of fixation in a dent (5) on the shell of the hollow particles as the result of the fine particles pushing into the thermoplastic resin shell melted by heat. The particle shape of the fine particles can be irregular or spherical.

The fine particles, which are usually added to a composition prepared by blending the hollow particles and a base component, can be coated on the outer surface of the hollow particles before the particles are blended with the base component. Such work enables easy dispersion of the fine particles which are usually difficult to disperse uniformly.

The mean particle size of the fine particles is not specifically restricted, and is selected depending on hollow particles to be coated. The mean particle size of the fine particles preferably ranges from 0.001 to 30 µm, more preferably from 0.005 to 25 µm, and most preferably from 0.01 to 20 µm.

The fine particles of various materials including both inorganic and organic substances—can be employed. The shape of the fine particles includes spherical, needle-like and plate-like shapes.

The fine particles include, for example, organic fine particles including metal soaps such as magnesium stearate, calcium stearate, zinc stearate, barium stearate and lithium stearate; synthetic waxes, such as polyethylene wax, lauric amide, myristic amide, palmitic amide, stearic amide and hydrogenated castor oil; and organic fillers, such as polyacrylamide, polyimide, nylon, polymethylmethacrylate, polyethylene and polytetrafluoroethylene. Examples of the inorganic fine particles include talc, mica, bentonite, sericite, carbon black, molybdenum disulfide, tungsten disulfide, carbon fluoride, calcium fluoride and boron nitride; and inorganic fillers, such as silica, alumina, isinglass, colloidal calcium carbonate, heavy calcium carbonate, calcium hydroxide, calcium phosphate, magnesium hydroxide, magnesium phosphate, barium sulfate, titanium dioxide, zinc oxide, ceramic beads, glass beads, and crystal beads.

The mean particle size of the fine particles is preferably not greater than 10% of the mean particle size of the fine-particles-coated hollow particles. The mean particle size as used herein is the mean particle size of the primary particles The fine-particle-coated hollow particles are useful for preparing a paint composition or adhesive composition by blending the hollow particles in the compositions mentioned below.

The process for producing the fine-particle-coated hollow particles includes, for example, a process including the steps of blending heat-expandable microspheres and fine particles (blending step), and heating the mixture prepared in the blending step to expand the heat-expandable microspheres and simultaneously adhere the fine particles on the outer surface of the shell of the resultant hollow particles (adhering step).

The true specific gravity of the fine-particle-coated hollow particles is not specifically restricted, and preferably ranges from 0.01 to 0.6, more preferably from 0.03 to 0.5, further more preferably from 0.05 to 0.4, and most preferably from 0.07 to 0.3. Fine-particle-coated hollow particles having a true specific gravity less than 0.01 can have poor durability. On the other hand, fine-particle-coated hollow particles having a true specific gravity greater than 0.6 are not cost-effective. This is because such fine-particle-coated hollow particles have a poor lightweight effect and a high amount of the fine-particle-coated hollow particles is required to prepare the composition containing the fine-particle-coated hollow particles.

Compositions and Formed Products

The composition of the present invention contains a base component and at least one particulate material selected from the group consisting of the heat-expandable microspheres of the present invention and the hollow particles of the present invention.

The base component is not specifically restricted, and includes, for example, rubbers, such as natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluororubber and ethylene-propylene-diene rubber (EPDM); thermosetting resins, such as epoxy resins, phenolic resins, unsaturated polyester resins and polyurethane; waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin) and polystyrene (PS); ionomer resins, such as ethylene ionomers, urethane ionomers, styrene ionomers and fluorine ionomers; thermoplastic elastomers, such as olefin elastomers, styrene elastomers and polyester elastomers; sealing materials, such as modified silicones, polyurethanes, polysulfides, acrylates, silicones, polyisobutylenes and butyl rubbers; paint components, such as urethane polymers, ethylene-vinyl acetate copolymers, vinyl chloride polymers, acrylate polymers, alkyd resins, amino alkyd resins, amino resins, chlorinated rubbers, epoxy resins, phenol resins, fluorine resins and polyester resins; and inorganic materials, such as cement, mortar and cordierite The composition of the present invention is prepared by mixing a base component(s) and the heat-expandable microspheres and/or hollow particles. The composition prepared by mixing the base component and heat-expandable microspheres and/or hollow particles can be blended with another base component to be prepared into the composition of the present invention.

The amount of the heat-expandable microspheres and/or hollow particles preferably ranges from 0.1 to 70 parts by weight to 100 parts by weight of the base component, more preferably from 0.5 to 65 parts by weight and further more preferably from 1 to 60 parts by weight.

The process for mixing the ingredients is not specifically restricted, and are preferably mixed with a kneader, roller kneader, mixing roller, mixer, single screw kneader, twin screw kneader or multi-screw kneader.

Applications of the composition of the present invention include, for example, molding compositions, paint compositions, clay compositions, fiber compositions, adhesive compositions and powder compositions.

The composition of the present invention can be used as a master batch for resin molding if the composition contains the heat-expandable microspheres and the base component including the compounds and/or thermoplastic resins having a melting point lower than the expansion initiation temperature of the heat-expandable microspheres (for example, waxes, such as polyethylene waxes and paraffin waxes; thermoplastic resins, such as ethylene-vinyl acetate copolymer (EVA), polyethylene, modified polyethylene, polyvinyl chloride resin (PVC), acrylic resin, thermoplastic polyurethane, acrylonitrile-styrene copolymer (AS resin), acrylonitrile-butadiene-styrene copolymer (ABS resin) and polystyrene (PS); ionomer resins, such as ethylene ionomers, urethane ionomers, styrene ionomers, and fluorine ionomers; and thermoplastic elastomers, such as olefin elastomers, styrene elastomers and polyester elastomers). The master-batch composition for resin molding is preferably employed in injection molding, extrusion molding and press molding for the purpose of introducing bubbles into molded products. Resins used for resin molding can be selected from the base component mentioned above without restriction, and include, for example, ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), olefin elastomers, styrene elastomers, polyester elastomers, natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluororubber, ethylene-propylene-diene rubber (EPDM), and their mixtures. The composition can optionally contain reinforcing fibers, such as glass fiber, carbon fiber and natural fibers; inorganic powders, such as talc, titanium oxide, silica and inorganic pigments; organic powders, such as polymer particulates including acrylic particulate, styrene particulate, urethane particulate and silicone particulate, and organic pigments; flame retardants; and chemical blowing agents.

The composition of the present invention can be molded in a lower temperature region than the conventional compositions because it contains at least one particulate material selected from the heat-expandable microspheres and hollow particles of the present invention.

The composition of the present invention can be processed in molding processes, such as injection molding, extrusion molding, kneading molding, calendaring, blow molding, compaction molding, vacuum molding and thermal molding.

The formed product of the present invention is manufactured by forming the composition mentioned above. The formed product of the present invention includes, for example, molded products and coating films. The formed products of the present invention have improved lightweight effect, porosity, sound absorbing performance, thermal insulation, design potential, shock absorbing performance and strength, and low thermal conductivity and dielectric property.

The formed products containing inorganic materials as the base component can be further burnt to be processed into ceramic filters and the like.

EXAMPLES

Examples of the heat-expandable microspheres of the present invention are specifically described below, however the present invention should not be construed as being limited thereto.

The properties of the heat-expandable microspheres of the following examples and comparative examples were measured as described below and their respective performances were also tested and evaluated. The heat-expandable microspheres are also hereinafter referred to as "microspheres" for concise expression.

Determination of the Mean Particle Size

A sample of microspheres was analyzed with a laser diffraction-scattering particle size analyzer (Microtrac ASVR, supplied by Nikkiso). The mean volume diameter $D_{50}$ determined in the analysis was defined as the mean particle size.

Determination of the Expansion-Initiation Temperature ($T_s$) and the Maximum Expansion Temperature ($T_{max}$) of Heat-Expandable Microspheres The maximum expansion temperature was determined with a DMA (DMA Q800, manufactured by TA Instruments). In an aluminum cup of 4.8 mm deep and 6.0 mm in diameter, 0.5 mg of a sample of heat-expandable microspheres was placed, and the cup was covered with an aluminum cap (5.6 mm in diameter and 0.1 mm thick) to prepare a test sample. The test sample was set on the device and subjected to a pressure of 0.01 N with the compression unit of the device, and the height of the sample was measured. The sample was then heated by elevating the temperature at a rate of 10° C./min from 20 to 300° C., being subjected to a pressure of 0.01 N with the compression unit, and the change in the height of the sample was measured. The temperature at which the height started to increase was determined as the expansion-initiation temperature (Ts), and the temperature at which the compression unit indicated the highest position ($D_{max}$) was determined as the maximum expansion temperature ($T_{max}$).

Expansion Performance at Low Temperature

A point on a sheet of plain paper (hereinafter referred to as the point P) was randomly selected and marked, and the thickness of the paper at the point (Lp) was measured with a film thickness meter.

One gram of dry microspheres and 7.3 g of an aqueous emulsion of ethylene-vinyl acetate copolymer resin (the aqueous emulsion containing 55 wt % of ethylene-vinyl acetate copolymer resin composed of 30 wt % of ethylene and 70 wt % of vinyl acetate) were mixed and prepared into a paste composition containing the microspheres and ethylene-vinyl acetate copolymer resin in the ratio by solid weight of 1:4.

Then the paste composition was applied on the area of the plain paper including the point P with a coater having a 100

µm gap and dried at room temperature to make an EVA coating film containing unexpanded microspheres (hereinafter referred to as unexpanded EVA coating film). Then the total thickness ($Q_P$) of the plain paper and the unexpanded EVA coating film at the point P was measured with the film thickness meter.

The unexpanded EVA coating film on the plain paper formed as described above was placed in a gear oven preheated at T °C. and heated for 1 min to expand the EVA coating film. After the 1-min heating, the coating film on the paper was taken out and the total thickness ($R_P$) of the plain paper and the expanded EVA coating film at the point P was measured with the film thickness meter.

The expansion ratio $S_T$ (times) of the EVA coating film at the point P can be calculated by the following formula (III).

$$S_T (\text{times}) = (R_P - L_P)/(Q_P - L_P) \quad (III)$$

In actual testing, three different points on the paper were marked as the points P to determine the $S_T$ (times) at each point, and the average of the $S_T$s at the three points was determined as the expansion ratio, $S_T$ (times), of the EVA coating film at T °C.

The expansion performance of the heat-expandable microspheres of the present invention was evaluated by the expansion ratio, $S_T$ (times), of the EVA coating film at T °C. The temperature, T, was set at two points, 90° C. and 120° C. In Tables 1 to 3, the coating films resulting in $S_{90°C.} < 1.5$ or $S_{120°C.} < 5$ were evaluated as "C" which means poor expansion performance at low temperature, the films resulting in $1.5 \leq S_{90°C.} < 2$ or $5 \leq S_{120°C.} < 6$ were evaluated as "B" which means good expansion performance at low temperature, and the films resulting in $2 \leq S_{90°C.}$ or $6 \leq S_{120°C.}$ were evaluated as "A" which means excellent expansion performance at low temperature.

Solvent Resistance

Dry microspheres (X) and toluene (in the amount three times of the weight of the dry microspheres) were placed in a vial container, shaken well and allowed to stand at room temperature for 3 days. Then the mixture was filtered and microspheres remaining on the filter were dried to obtain the dry microspheres (Y). Using each of the microspheres (X) and (Y), the expansion ratio of the EVA coating film at 120° C., $S_{120°C.}$, was measured in the procedure mentioned above. The $S_{120°C.}$ measured with the microspheres (X), $S_{120°C.,X}$, and the $S_{120°C.}$ measured with the microspheres (Y), $S_{120°C.,Y}$, were used to calculate the solvent resistance of the microspheres, Z, by the following formula (IV).

$$Z = S_{120°C.,Y}/S_{120°C.,X} \quad (IV)$$

In Tables 1 to 3, the microspheres resulting in $Z < 0.8$ were evaluated as "C" which means poor solvent resistance, the microspheres resulting in $0.8 \leq Z < 0.9$ were evaluated as "B" which means good solvent resistance, and the microspheres resulting in $0.9 \leq Z$ were evaluated as "A" which means excellent solvent resistance.

Example 1

An aqueous dispersion medium was prepared by adding 50 g of sodium chloride, 40 g of colloidal silica containing 20 wt % of silica, 1.0 g of polyvinyl pyrolidone and 0.1 g of carboxymethylated polyethylene imine (CMPEI, having 80% of —$CH_2COONa$ as substituted alkyl groups, with weight-average M.W. of 50,000) to 310 g of deionized water and adjusting the pH of the mixture within the range from 2.5 to 3.5. The CMPEI is the same as that described in paragraph [0140] of WO2008/142849.

An oily mixture was prepared by mixing 80 g of acrylonitrile, 10 g of n-butyl acrylate, 10 g of methyl methacrylate, 1.0 g of trimethylolpropane trimethacrylate, 1.0 g of lauroyl peroxide and 33 g of isobutane.

The aqueous dispersion medium and the oily mixture were mixed and agitated with a Homo-mixer (TK Homomixer, manufactured by Primix Corporation) at 7,000 rpm for 1 min to prepare a suspension. Then the suspension was transferred into a compressive reactor having a 1.5-liter capacity, purged with nitrogen with the initial reaction pressure of 0.5 MPa, and polymerized at 70° C. for 20 hours with agitation at 80 rpm. The resultant polymerization product was filtered and dried to obtain heat-expandable microspheres. The mean particle size, expansion-initiation temperature, maximum expansion temperature, expansion performance at low temperature and solvent resistance of the resultant heat-expandable microspheres were determined. The results are shown in Table 1.

The heat-expandable microspheres produced in Example 1 satisfied the requirements of both of expansion performance at low temperature and solvent resistance.

TABLE 1

| | | | Example | | | | | | | |
|---|---|---|---|---|---|---|---|---|---|---|
| | | | 1 | 2 | 3 | 4 | 18 | 19 | 20 | 21 | 22 |
| Aqueous dispersion medium (g) | Deionized water | | 310 | 365 | 365 | 365 | 344 | 350 | 340 | 350 | 360 |
| | Sodium chloride | | 50 | | | | | | | | |
| | Colloidal silica | | 40 | 35 | 35 | 35 | 55 | 50 | 60 | 50 | 40 |
| | PVP | | 1 | 1 | 1 | 1 | 2 | 1 | 1 | 1 | 1 |
| | CMPEI | | 0.1 | 0.1 | 0.1 | 0.1 | 0.1 | 0.1 | 0.1 | 0.1 | 0.1 |
| Polymerizable component (g) | AN | | 80 | 70 | 45 | 25 | 85 | 75 | 65 | 55 | 50 |
| | Acrylate monomer (A) represented by the formula (1) | n-PRA | | | | | | | | | |
| | | n-BA | 10 | 10 | 15 | 25 | 10 | 15 | 15 | 10 | 25 |
| | | n-HXA | | | | | | | | | |
| | | 2-EHXA | | | | | | | | | |
| | | i-AA | | | | | | | | | |
| | | LA | | | | | | | | | |
| | | SA | | | | | | | | | |
| | Methacrylate monomer (B) represented by the formula (2) | MMA | 10 | 20 | 40 | 50 | 5 | 10 | 20 | 35 | 25 |
| | | n-BMA | | | | | | | | | |

TABLE 1-continued

|  |  |  | Example |  |  |  |  |  |  |  |  |
|---|---|---|---|---|---|---|---|---|---|---|---|
|  |  |  | 1 | 2 | 3 | 4 | 18 | 19 | 20 | 21 | 22 |
|  | Other monomer (C) | MA<br>2-EHXMA<br>MAN<br>VCl2 |  |  |  |  |  |  |  |  |  |
|  | Cross-linking agent | TMP<br>4EG-A<br>EDMA | 1.0 | 1.5 | 1.5 | 1.5 | 0.1<br>0.3 | 0.3 |  | 0.4 | 0.5 |
| Polymerization initiator (g) | PEROYL L<br>OPP<br>PERHEXYL PV |  | 1.0 | 1.0 | 1.0 | 0.5 | 1.5 | 0.8 | 1.0 | 0.5 | 0.3 |
| Blowing agent (g) | Isobutane<br>Isopentane |  | 33 | 33 | 33 | 33 | 40 | 22 | 27 | 22 | 20 |
| Mean particle size (μm) |  |  | 20 | 21 | 20 | 18 | 10 | 15 | 8 | 12 | 14 |
| Expansion initiation temperature (° C.) |  |  | 83 | 79 | 78 | 84 | 85 | 76 | 72 | 87 | 71 |
| Maximum expansion temperature (° C.) |  |  | 126 | 121 | 122 | 126 | 129 | 125 | 119 | 121 | 116 |
| Expansion performance at low temperature | $S_{90°C.}$<br>$S_{120°C.}$ |  | A<br>A | A<br>A | A<br>A | B<br>A | B<br>A | B<br>A | A<br>A | B<br>A | A<br>A |
| Solvent resistance | Z |  | A | A | B | B | A | A | A | A | A |

TABLE 2

|  |  |  | Example |  |  |  |  |  |  |  |  |  |  |
|---|---|---|---|---|---|---|---|---|---|---|---|---|---|
|  |  |  | 5 | 6 | 7 | 8 | 9 | 10 | 11 | 12 | 23 | 24 | 25 |
| Aqueous dispersion medium (g) | Deionized water<br>Sodium chloride<br>Colloidal silica<br>PVP<br>CMPEI |  | 365<br><br>35<br>1<br>0.1 | 365<br><br>35<br>1<br>0.1 | 310<br>50<br>40<br>1<br>0.1 | 365<br><br>35<br>1<br>0.1 | 365<br><br>35<br>1<br>0.1 | 365<br><br>35<br>1<br>0.1 | 310<br>50<br>40<br>1<br>0.1 | 310<br>50<br>40<br>1<br>0.1 | 340<br><br>60<br>2<br>0.1 | 345<br><br>55<br>2<br>0.1 | 340<br><br>60<br>2<br>0.1 |
| Polymerizable component (g) | AN<br>Acrylate monomer (A) represented by the formula (1) | n-PRA<br>n-BA<br>n-HXA<br>2-EHXA<br>i-AA<br>LA<br>SA | 85<br><br><br><br>5<br><br><br>  | 75<br><br>10<br><br><br><br><br>  | 70<br><br>18<br><br><br><br><br>1 | 69<br>10<br>13<br><br><br>1<br><br>  | 60<br><br>28<br><br><br><br><br>  | 50<br><br>10<br>10<br><br><br>5<br>  | 49<br><br>35<br><br><br><br>5<br>4 | 40<br><br><br><br>3<br><br><br>  | 80<br><br>8<br><br>20<br><br><br>  | 55<br><br>20<br><br><br><br><br>  | 55<br><br><br>5<br><br><br><br>  |
|  | Methacrylate monomer (B) represented by the formula (2) | MMA<br>n-BMA | 2<br>8 | <br>15 | 10<br>  | <br>8 | 10<br>2 | 20<br>  | 7<br>  | 30<br>10 | <br>10 | 15<br>10 | 10<br>30 |
|  | Other monomer (C) | MA<br>2-EHXMA<br>MAN<br>VCl2 |  |  |  |  |  |  |  |  |  |  |  |
|  | Cross-linking agent | TMP<br>4EG-A<br>EDMA | 1.0 | 1.0 | 1.5<br>  | 1.0 | 1.0 | 1.0 | <br><br>1.0 | <br><br>1.0 | 0.1<br>0.3<br>  | <br><br>  | <br><br>0.1 |
| Polymerization initiator (g) | PEROYL L<br>OPP<br>PERHEXYL PV |  | <br><br>0.5 | <br>1.0<br>  | 1.0 | 1.0 | 1.0 | 1.0 | <br>1.0<br>  | 1.0<br><br>  | <br>1.5<br>  | 1.0 | 1.0 |
| Blowing agent (g) | Isobutane<br>Isopentane |  | 33 | 33 | 33 | 33 | 33 | 33 | 33 | 33 | 22 | 25 | 25 |
| Mean particle size (μm) |  |  | 20 | 22 | 19 | 22 | 18 | 22 | 20 | 24 | 13 | 15 | 14 |
| Expansion initiation temperature (° C.) |  |  | 87 | 81 | 74 | 76 | 77 | 83 | 74 | 73 | 83 | 74 | 86 |
| Maximum expansion temperature (° C.) |  |  | 132 | 122 | 118 | 110 | 111 | 118 | 106 | 115 | 124 | 116 | 113 |
| Expansion performance at low temperature | $S_{90°C.}$<br>$S_{120°C.}$ |  | B<br>A | A<br>A | A<br>A | A<br>B | A<br>B | A<br>B | A<br>B | A<br>B | B<br>A | A<br>A | B<br>A |
| Solvent resistance | Z |  | A | A | A | A | B | B | B | B | A | B | B |

TABLE 3

|  |  | Example |  |  |  |  |  |
|---|---|---|---|---|---|---|---|
|  |  | 13 | 14 | 15 | 16 | 17 | 26 |
| Aqueous dispersion medium (g) | Deionized water<br>Sodium chloride<br>Colloidal silica | 365<br><br>35 | 365<br><br>35 | 365<br><br>35 | 365<br><br>35 | 365<br><br>35 | 340<br><br>60 |

TABLE 3-continued

| | | | Example | | | | | |
|---|---|---|---|---|---|---|---|---|
| | | | 13 | 14 | 15 | 16 | 17 | 26 |
| | PVP | | 1 | 1 | 1 | 1 | 1 | 2 |
| | CMPEI | | 0.1 | 0.1 | 0.1 | 0.1 | 0.1 | 0.1 |
| Polymerizable component (g) | AN | | 67 | 65 | 49 | 63 | 62 | 55 |
| | Acrylate monomer (A) represented by the formula (1) | n-PRA | | | | | | |
| | | n-BA | 10 | 10 | 7 | 9 | 10 | 8 |
| | | n-HXA | | | | | | 4 |
| | | 2-EHXA | | | | | | |
| | | i-AA | | | | | | |
| | | LA | | | | | | |
| | | SA | | | | | | |
| | Methacrylate monomer (B) represented by the formula (2) | MMA | 20 | 20 | 14 | 18 | 20 | 10 |
| | | n-BMA | | | | | | 10 |
| | Other monomer (C) | MA | | | 10 | | | 10 |
| | | 2-EHXMA | | | 5 | | | |
| | | MAN | 3 | | 5 | | 3 | 3 |
| | | VCl2 | | 5 | 10 | 10 | 5 | |
| | Cross-linking agent | TMP | | | 0.3 | 0.3 | 1.0 | 0.1 |
| | | 4EG-A | | 1.5 | | | | |
| | | EDMA | 1.0 | | | | | |
| Polymerization initiator (g) | PEROYL L | | 1.0 | | 2.0 | 2.0 | | |
| | OPP | | | | | | 1.0 | 1.5 |
| | PERHEXYL PV | | | 0.5 | | | | |
| Blowing agent (g) | Isobutane | | 33 | 33 | 38 | 38 | 33 | 22 |
| | Isopentane | | | | | | | |
| Mean particle size (μm) | | | 23 | 21 | 21 | 21 | 21 | 13 |
| Expansion initiation temperature (° C.) | | | 82 | 77 | 84 | 85 | 86 | 83 |
| Maximum expansion temperature (° C.) | | | 116 | 115 | 120 | 118 | 119 | 124 |
| Expansion performance at low temperature | $S_{90°\,C.}$ | | A | A | B | B | A | B |
| | $S_{120°\,C.}$ | | A | A | A | A | A | A |
| Solvent resistance | Z | | A | A | B | B | A | B |

TABLE 4

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Aqueous dispersion medium (g) | Deionized water | | 365 | 365 | 310 | 365 | 365 | 365 | 365 | 365 | 365 |
| | Sodium chloride | | | | 50 | | | | | | |
| | Colloidal silica | | 35 | 35 | 40 | 35 | 35 | 35 | 35 | 35 | 35 |
| | PVP | | 1 | 1 | 1 | 1 | 1 | 1 | 1 | 1 | 1 |
| | CMPEI | | 0.1 | 0.1 | 0.1 | 0.1 | 0.1 | 0.1 | 0.1 | 0.1 | 0.1 |
| Polymerizable component (g) | AN | | 94 | 94 | 35 | 20 | 10 | 10 | 80 | 80 | 60 |
| | Acrylate monomer (A) represented by the formula (1) | n-PRA | | | | | | | | | |
| | | n-BA | 4 | 2 | 60 | 5 | 60 | 30 | 20 | | |
| | | n-HXA | | | | | | | | | |
| | | 2-EHXA | | | | | | | | | |
| | | i-AA | | | | | | | | | |
| | | LA | | | | | | | | | |
| | | SA | | | | | | | | | |
| | Methacrylate monomer (B) represented by the formula (2) | MMA | 2 | 4 | 5 | 75 | 30 | 60 | | 20 | 40 |
| | | n-BMA | | | | | | | | | |
| | Other monomer (C) | MA | | | | | | | | | |
| | | 2-EHXMA | | | | | | | | | |
| | | MAN | | | | | | | | | |
| | | VCl2 | | | | | | | | | |
| | Cross-linking agent | TMP | | | | 1.0 | 1.0 | 1.0 | 1.0 | 1.0 | 1.0 |
| | | 4EG-A | 1.5 | 1.5 | 1.5 | | | | | | |
| | | EDMA | | | | | | | | | |
| Polymerization initiator (g) | PEROYL L | | 1.0 | 1.0 | 1.0 | | | | | | |
| | OPP | | | | | 1.0 | 1.0 | 1.0 | 1.0 | 1.0 | 1.0 |
| | PERHEXYL PV | | | | | | | | | | |
| Blowing agent (g) | Isobutane | | 33 | 33 | 33 | 33 | 33 | 33 | 33 | 33 | 33 |
| | Isopentane | | | | | | | | | | |
| Mean particle size (μm) | | | 23 | 22 | 23 | 19 | 18 | 21 | 18 | 20 | 19 |
| Expansion initiation temperature (° C.) | | | 108 | 111 | 47 | 86 | 42 | 64 | 77 | 112 | 111 |

TABLE 4-continued

|  | | Comparative Example | | | | | | | | |
|---|---|---|---|---|---|---|---|---|---|---|
|  | | 1 | 2 | 3 | 4 | 5 | 6 | 7 | 8 | 9 |
| Maximum expansion temperature (° C.) | | 146 | 152 | 83 | 119 | 84 | 107 | 101 | 147 | 138 |
| Expansion performance | $S_{90° C.}$ | C | C | B | B | C | A | B | C | C |
| at low temperature | $S_{120° C.}$ | C | C | C | B | C | B | C | B | B |
| Solvent resistance | Z | A | A | C | C | C | C | A | A | A |

TABLE 5

|  |  |  | Comparative Example | | | | | | |
|---|---|---|---|---|---|---|---|---|---|
|  |  |  | 10 | 11 | 12 | 13 | 14 | 15 | 16 |
| Aqueous dispersion medium (g) | Deionized water | | 365 | 365 | 365 | 365 | 365 | 365 | 365 |
|  | Sodium chloride | | | | | | | | |
|  | Colloidal silica | | 35 | 35 | 35 | 35 | 35 | 35 | 35 |
|  | PVP | | 1 | 1 | 1 | 1 | 1 | 1 | 1 |
|  | CMPEI | | 0.1 | 0.1 | 0.1 | 0.1 | 0.1 | 0.1 | 0.1 |
| Polymerizable component (g) | AN | | 70 | 60 | 60 | 52 | 50 | 45 | 40 |
|  | Acrylate monomer (A) represented by the formula (1) | n-PRA | | | | | | | |
|  |  | n-BA | 10 | | | | | | |
|  |  | n-HXA | | | | | | | |
|  |  | 2-EHXA | | | | | | | |
|  |  | i-AA | | | | | | | |
|  |  | LA | | | | | | | |
|  |  | SA | | | | | | | |
|  | Methacrylate monomer (B) represented by the formula (2) | MMA | | 18 | 10 | | 20 | | 10 |
|  |  | n-BMA | | | | | | | |
|  | Other monomer (C) | MA | | 22 | 30 | 20 | 30 | 30 | |
|  |  | 2-EHXMA | 20 | | | | | | |
|  |  | MAN | | | | 28 | | 25 | |
|  |  | VCl2 | | | | | | | 50 |
|  | Cross-linking agent | TMP | | 1.0 | | 0.3 | 1.0 | 0.3 | 1.0 |
|  |  | 4EG-A | 1.5 | | 1.5 | | | | |
|  |  | EDMA | | | | | | | |
| Polymerization initiator (g) | PEROYL L | | | | 1.0 | 2.0 | | 2.0 | |
|  | OPP | | 1.0 | 1.0 | | | 1.0 | | 1.0 |
|  | PERHEXYL PV | | | | | | | | |
| Blowing agent (g) | Isobutane | | 33 | 33 | 33 | 38 | 18 | 38 | 33 |
|  | Isopentane | | | | | | 15 | | |
| Mean particle size (μm) | | | 19 | 19 | 22 | 21 | 19 | 19 | 18 |
| Expansion initiation temperature (° C.) | | | 74 | 92 | 85 | 94 | 86 | 99 | 74 |
| Maximum expansion temperature (° C.) | | | 103 | 116 | 123 | 152 | 121 | 146 | 119 |
| Expansion performance | $S_{90° C.}$ | | A | C | B | C | B | C | A |
| at low temperature | $S_{120° C.}$ | | C | A | A | A | A | A | A |
| Solvent resistance | Z | | B | C | C | C | C | C | C |

The names of the ingredients of the aqueous dispersion media and oily mixtures are abbreviated in Tables 1 to 5 as described below.

PVP: polyvinylpyrrolidone
CMPEI: polyethylene imine having 80% of —CH₂COONa as substituted alkyl groups, with weight average M.W. of 50,000, also described as carboxymethylated polyethylene imine sodium salt
AN: acrylonitrile
n-PRA: n-propyl acrylate
n-BA: n-butyl acrylate
n-HXA: n-hexyl acrylate
2-EHXA: 2-ethylhexyl acrylate
i-AA: isoamyl acrylate
LA: lauryl acrylate
SA: stearyl acrylate
MMA: methyl methacrylate
n-BMA: n-butyl methacrylate
MA: methyl acrylate
2-EHXMA: 2-ethylhexyl methacrylate
MAN: methacrylonitrile
VC12: vinylidene chloride monomer
TMP: trimethylol propane trimethacrylate
4EG-A: PEG (200) dimethacrylate
EDMA: ethylene glycol dimethacrylate
PEROYL L: lauroyl peroxide
OPP: di-2-ethylhexyl peroxydicarbonate (70% concentration)
PERHEXYL PV: t-hexyl peroxypivalate (70% concentration)

Examples 2 to 26 and Comparative Examples 1 to 16

In Examples 2 to 26 and Comparative Examples 1 to 16, heat-expandable microspheres were prepared in the same manner as in Example 1, except that the raw materials were replaced by those described in Tables 1 to 5. The polymerization temperature in the processes using di-2-ethylhexyl peroxydicarbonate was adjusted at 55° C., and that in the processes using t-hexyl peroxypivalate was adjusted at 60° C. The mean particle size, expansion initiation temperature, maximum expansion temperature, expansion performance at low temperature and solvent resistance of the resultant heat-expandable microspheres were measured. The results are shown in Tables 1 to 5.

The heat-expandable microspheres produced in Examples 2 to 26 satisfied the requirements of both of expansion performance at low temperature and solvent resistance. The heat-expandable microspheres produced in Comparative Examples 1 to 16 did not satisfy the requirement of expansion performance at low temperature or solvent resistance.

The heat-expandable microspheres produced in Examples 1 to 26 exhibited superior expansion performance at low temperature and solvent resistance as compared to those of the heat-expandable microspheres produced in Comparative Examples 1 to 16.

INDUSTRIAL APPLICABILITY

The present invention provides heat-expandable microspheres having a high expansion performance at a low temperature and good solvent resistance. The heat-expandable microspheres of the present invention, which have a high expansion performance at low temperature, can be used in applications where microspheres are required to expand sufficiently at a low temperature region (for example around 100° C.). In addition, the heat-expandable microspheres of the present invention can be combined with materials containing solvents, such as liquid compositions, pastes including vinyl chloride pastes, EVA emulsions, acrylate emulsions and solvent-type binders owing to their good solvent resistance.

The heat-expandable microspheres of the present invention can be used, in the form of unexpanded microspheres or expanded hollow particles, to reduce the density of putties, paints, inks, wall papers, paper clays, porcelains, mortar and sealants, to make them porous or to impart other functions, owing to their expansion performance and light weight effect.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. Heat-expandable microspheres having a core-shell structure comprising a thermoplastic resin shell and a thermally-vaporizable blowing agent encapsulated therein;
wherein a mean particle size of the heat-expandable microspheres ranges from 1 to 50 μm,
wherein the thermoplastic resin of the thermoplastic resin shell is a copolymer produced from a polymerizable component containing 15 to 90 wt % of acrylonitrile, 3 to 50 wt % of an acrylate ester monomer (A) represented by formula (1), and 3 to 70 wt % of a methacrylate ester monomer (B) represented by formula (2);
wherein a total amount of acrylonitrile, the acrylate ester monomer (A) represented by formula (1) and the methacrylate ester monomer (B) represented by formula (2) in the polymerizable component ranges from 80 to 100 wt %;
wherein a weight ratio of the acrylate ester monomer (A) represented by the formula (1) to the methacrylate ester monomer (B) represented by the formula (2) in the polymerizable component (A:B) ranges from 10:90 to 90:10:

$$H_2C=CH-COOR^1 \quad (1)$$

where $R^1$ is a $C_3$-$C_{18}$ linear or branched alkyl group;

$$H_2C=C(CH_3)-COOR^2 \quad (2)$$

where $R^2$ represents a methyl or ethyl group, and
wherein an expansion-initiation temperature of the heat-expandable microspheres is 50 to 87° C.

2. The heat-expandable microspheres as claimed in claim 1, wherein the total amount of acrylonitrile, the acrylate ester monomer (A) represented by formula (1) and the methacrylate ester monomer (B) represented by formula (2) in the polymerizable component ranges from 90 to 100 wt %.

3. The heat-expandable microspheres as claimed in claim 1, wherein the acrylate ester monomer (A) represented by formula (1) is at least one monomer selected from the group consisting of n-propyl acrylate, isopropyl acrylate, n-butyl acrylate, isobutyl acrylate, t-butyl acrylate, n-pentyl acrylate and n-hexyl acrylate.

4. The heat-expandable microspheres as claimed in claim 1, wherein the methacrylate ester monomer (B) represented by formula (2) is methyl methacrylate.

5. The heat-expandable microspheres as claimed in claim 1, wherein an amount of methacrylonitrile in the polymerizable component ranges from 0 to less than 5 wt %.

6. The heat-expandable microspheres as claimed in claim 1, wherein an amount of vinylidene chloride in the polymerizable component ranges from 0 to less than 10 wt %.

7. Hollow particles manufactured by expanding the heat-expandable microspheres as claimed in claim 1.

8. A composition containing a base component and the heat-expandable microspheres as claimed in claim 1.

9. A formed product manufactured by molding or applying the composition as claimed in claim 8.

10. A composition containing a base component and the hollow particles as claimed in claim 7.

11. A formed product manufactured by molding or applying the composition as claimed in claim 10.

12. The heat-expandable microspheres as claimed in claim 1, wherein the thermally-vaporizable blowing agent is at least one selected from the group consisting of straight-chain hydrocarbons, branched hydrocarbons and alicyclic hydrocarbons.

13. The heat-expandable microspheres as claimed in claim 1, wherein the thermoplastic resin of the thermoplastic resin shell is a copolymer produced from a polymerizable component containing 54.9 to 90 wt % of acrylonitrile, 3 to 40 wt % of an acrylate ester monomer (A) represented by formula (1), and 3 to 40 wt % of a methacrylate ester monomer (B) represented by formula (2).

14. The heat-expandable microspheres as claimed in claim 1, wherein the weight ratio of the acrylate ester monomer (A) represented by the formula (1) to the methacrylate ester monomer (B) represented by the formula (2) in the polymerizable component (A:B) ranges from 30:70 to 90:10.

15. The heat-expandable microspheres as claimed in claim 1, wherein the thermoplastic resin of the thermoplastic resin shell is a copolymer produced from a polymerizable component containing 15 to 60 wt % of acrylonitrile, 5 to 50 wt % of an acrylate ester monomer (A) represented by formula (1), and 35 to 70 wt % of a methacrylate ester monomer (B) represented by formula (2).

16. The heat-expandable microspheres as claimed in claim 1, wherein the expansion-initiation temperature of the heat-expandable microspheres is 50 to 85° C.

* * * * *